United States Patent [19]

Ando et al.

[11] 4,297,119
[45] Oct. 27, 1981

[54] APPARATUS FOR VITRIFYING BLAST FURNACE SLAG

[75] Inventors: Ryo Ando; Kazuyoshi Sato, both of Yokohama, Japan

[73] Assignee: Nippon Kokan Kabushiki Kaisha, Tokyo, Japan

[21] Appl. No.: 100,055

[22] Filed: Dec. 4, 1979

[51] Int. Cl.³ .............................................. C03B 5/23
[52] U.S. Cl. ........................................ 65/141; 65/19; 241/23; 241/66; 241/166
[58] Field of Search ....................... 65/19, 141; 241/23, 241/66, 166

[56] References Cited

U.S. PATENT DOCUMENTS

| | | | |
|---|---|---|---|
| 1,843,716 | 2/1932 | Giller. | |
| 2,044,198 | 6/1936 | Bartholomew | 65/19 X |
| 2,324,938 | 7/1943 | Love | 75/24 |
| 2,643,485 | 6/1953 | Edwards. | |
| 3,133,804 | 5/1964 | Hardgrove | 65/141 |
| 3,278,284 | 10/1966 | Van Dolah et al. | 65/19 X |

FOREIGN PATENT DOCUMENTS

| | | |
|---|---|---|
| 38-17829 | 9/1963 | Japan. |
| 52-30149 | 8/1977 | Japan. |
| 53-19991 | 2/1978 | Japan. |
| 53-13323 | 5/1978 | Japan. |
| 153083 | 10/1920 | United Kingdom .................. 65/19 |

*Primary Examiner*—Arthur D. Kellogg
*Attorney, Agent, or Firm*—Frishauf, Holtz, Goodman & Woodward

[57] ABSTRACT

An apparatus for vitrifying blast furnace slag, which comprises:
an endless conveyor belt formed by endlessly connecting a plurality of rectangular cooling metal members, each of said cooling metal members having a plurality of narrow and deep cooling grooves on the outer surface thereof for rapidly cooling and solidifying a molten blast furnace slag into a vitreous blast furnace slag; a driving means for travelling said endless conveyor belt; a molten slag container, arranged above the upstream of the upper forwarding position of said endless conveyor belt, for pouring a molten blast furnace slag into said cooling grooves; a stripper arranged, in the upstream of the lower returning position of said endless conveyor belt, at a prescribed position adjacent to the back surface of said endless conveyor belt, for taking out a cooled and solidified vitreous blast furnace slag in said cooling grooves; and, a cooling means arranged at a prescribed position in the lower returning position of said endless conveyor belt, for sequentially cooling said cooling metal members heated by the high-temperature molten blast furnace slag poured into said cooling grooves.

12 Claims, 8 Drawing Figures

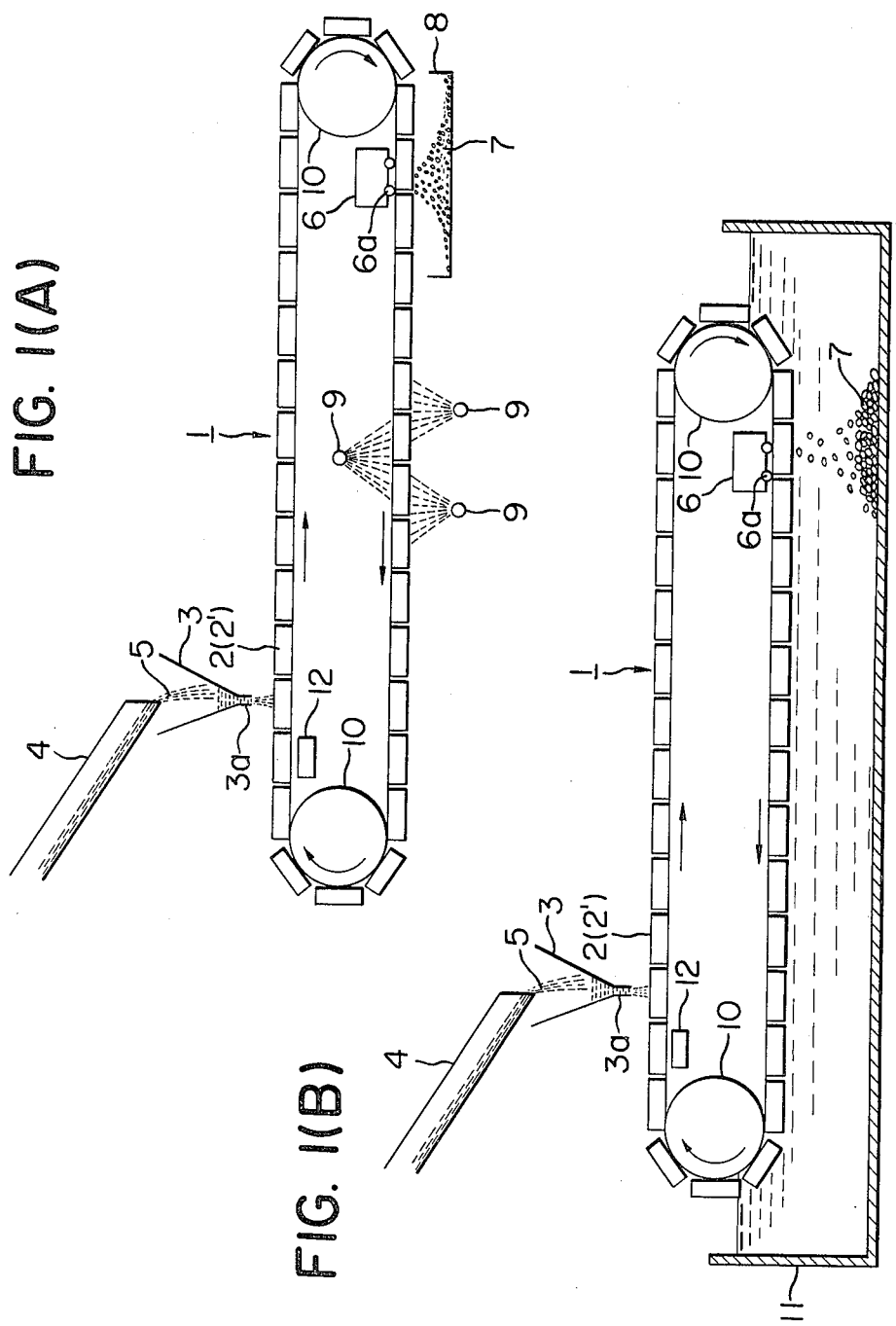

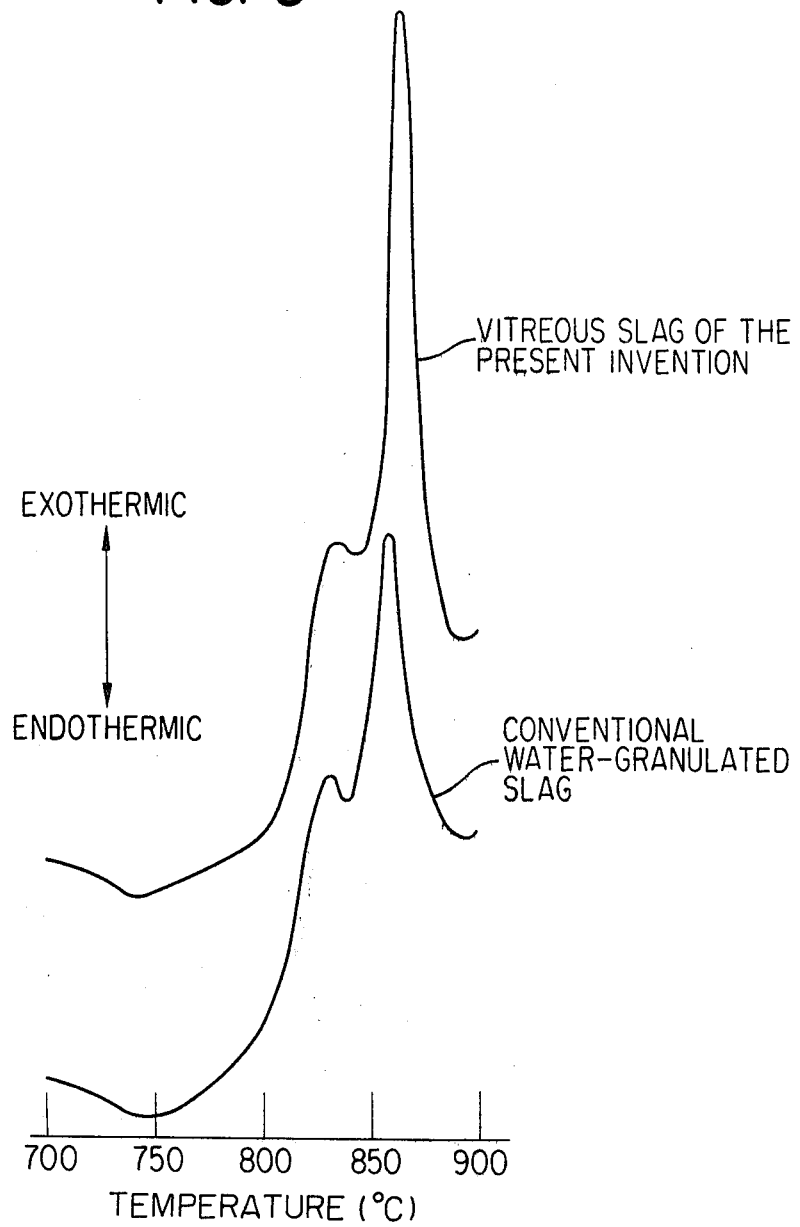

APPARATUS FOR VITRIFYING BLAST FURNACE SLAG

REFERENCE TO PATENTS, APPLICATIONS AND PUBLICATIONS PERTINENT TO THE INVENTION (1) Japanese Patent Publication No. 30,149/77 dated Aug. 5, 1977;
(2) Japanese Patent Publication No. 13,323/78 dated May 9, 1978;
(3) Japanese Patent Provisional Publication No. 19,991/78 dated Feb. 23, 1978;
(4) Japanese Patent Publication No. 17,829/63 dated Sept. 11, 1963; and,
(5) Japanese Patent Application No. 126,098/78 dated Oct. 16, 1978.

The contents of the above-mentioned prior documents (1) to (5) will be discussed under hereinbelow the caption the "BACKGROUND OF THE INVENTION".

FIELD OF THE INVENTION

The present invention relates to an apparatus for manufacturing a vitreous blast furnace slag substantially free of water, particularly adapted to serve as a raw material for a cement or for a calcium silicate fertilizer, which gives a high cooling rate sufficient to substantially completely vitrify a molten blast furnace slag.

BACKGROUND OF THE INVENTION

A water-granulated blast furnace slag (hereinafter referred to as a "water-granulated slag") used as a raw material for cement has conventionally been manufactured by spraying pressurized cooling water to a molten slag discharged from a blast furnace. Since the molten blast furnace slag is cooled and solidified through contact with the cooling water, the water-granulated slag thus obtained is vitrified. A water-granulated slag is usually applied as follows:

(a) as part of a raw material for a Portland cement clinker;
(b) to be added with a Portland cement;
(c) as a raw material for a blast furnace cement; and,
(d) as a raw material for a calcium silicate fertilizer.

However, because a water-granulated slag, coming into direct contact with a cooling water in the course of manufacturing, usually contains about 15 wt.% water. To apply a water-granulated slag for any of the uses mentioned in (a) through (d), it is necessary to dry the water-granulated slag in advance. This drying requires about 17 liters heavy oil per ton of water-granulated slag, and in addition, transportation cost for the unnecessary water content is required when transporting the water-granulated slag before drying. For the uses (b) and (c) above, furthermore, it is necessary to finely pulverize the water-granulated slag previously until the specific surface area value based on the Blaine-air-permeability method (hereinafter referred to as the "Blaine fineness") reaches from about 3,000 to about 4,000 $cm^2/g$, thus requiring from about 60 to about 100 KWH electric power per ton of water-granulated slag. During the manufacture of the water-granulated slag, contact with the cooling water leads to the production of such noxious gases as hydrogen sulfide gas, resulting in worsening working environments, and moreover, soluble substances useful for a cement contained in the slag such as lime, silica and alumina are lost by dissolution into the cooling water.

With these facts in view, the following granulating process and granulating apparatus of a molten blast furnace slag have been proposed.

(1) An apparatus for granulating a molten material such as a molten steel or a molten slag, disclosed in Japanese Patent Publication No. 30,149/77 dated Aug. 5, 1977, which comprises:

feeding a molten material such as a molten steel and a molten slag onto a rotary disk in rotation; granulating said molten material by causing said molten material to scatter under the effect of centrifugal force produced by the rotation of said disk; covering the periphery of said disk with a frustoconical casing flaring downwardly; forming a film of cooling water flowing downwardly along the inner surface of said casing; and, cooling and solidifying said granulated molten material by the contact with said film of cooling water (hereinafter referred to as the "prior art (1)").

(2) A method for treating a molten slag, disclosed in Japanese Patent Publication No. 13,323/78 dated May 9, 1978, which comprises:

feeding a molten slag into a rotating rotary drum inclined by 2° to 20° relative to the horizontal line from an inlet on the higher side thereof, while cooling the barrel of said drum by spraying cooling water onto the outer surface of said drum; cooling and solidifying said molten slag by the contact with the inner surface of said drum, and at the same time, crushing said solidified slag by the rotation of said drum; and, discharging said crushed slag from an outlet on the lower side of said drum (hereinafter referred to as the "prior art (2)").

(3) An apparatus for granulating a molten slag, disclosed in Japanese Patent Provisional Publication No. 19,991/78 dated Feb. 23, 1978, which comprises:

feeding a molten slag onto the outer surface of a rotating rotary drum; granulating said molten slag by causing same to scatter in front of said drum under the effect of centrifugal force produced by the rotation of said drum; and, cooling and solidifying said granulated molten slag by a cooling system installed within the scattering area of said granulated molten slag (hereinafter referred to as the "prior art (3)").

(4) A method for manufacturing a material for blast furnace cement, disclosed in Japanese Patent Publication No. 17,829/63 dated Sept. 11, 1963, which comprises:

vitrifying a molten blast furnace slag by granulating, while cooling and solidifying, said molten blast furnace slag by blowing the molten blast furnace slag with a pressurized fluid such as a pressurized air and a pressurized steam, or by causing the molten blast furnace slag fed onto a rotating rotary disk to scatter under the effect of centrifugal force produced by the rotation of said rotary disk; and, finely pulverizing said vitrified granulated blast furnace slag (hereinafter referred to as the "prior art (4)").

However, in any of the above-mentioned prior arts (1) to (4), partial crystallization of molten blast furnace slag is inevitable, because it is impossible to obtain a high cooling rate sufficient to completely vitrify the molten blast furnace slag. In the prior arts (1) and (3), furthermore, problems similar to those in the water-granulated slag mentioned above are encountered, since water is still employed as the cooling medium.

With a view to solving these problems, there has been proposed, in Japanese Patent Application No.

126,098/78 dated Oct. 16, 1978, an apparatus for manufacturing a vitreous blast furnace slag, which comprises:

a rotary drum having a substantially circular barrel formed by endlessly connecting a plurality of rectangular cooling metal members, each of said plurality of cooling metal members having on the outer surface thereof a plurality of narrow and deep cooling grooves with the longitudinal direction substantially in parallel with the rotating direction of said rotary drum, and each of said plurality of cooling grooves comprising an outwardly flaring inlet section for introducing a molten blast furance slag and an inwardly narrowing cooling section, following said inlet section, for rapidly cooling and solidifying the molten blast furnace slag into a vitreous blast furnace slag;

a driving mechanism, connected to the center axle of said rotary drum, for rotating said rotary drum;

a molten blast furnace slag feeder including a slag container, arranged above said rotary drum, said molten blast furnace slag feeder being adapted to receive a molten blast furnace slag discharged from a blast furnace into said slag container and pour said molten blast furnace slag thus received into said plurality of cooling grooves of said cooling metal member reaching about the highest position of the barrel of said rotary drum along with the rotation of said rotary drum;

a stripper stationarily arranged at a prescribed position in said rotary drum adjacent to the inner surface of the barrel of said rotary drum, said stripper being adapted to take out a cooled and solidified vitreous blast furnace slag in said plurality of cooling grooves of said cooling metal member; and, a cooling tank containing cooling water, arranged below said rotary drum so that the lower portion of the barrel of said rotary drum is immersed in the cooling water, said cooling tank being adapted to cause said plurality of cooling metal members forming the barrel of said rotary drum to successively pass through the cooling water in said cooling tank along with the rotation of said rotary drum, thereby cooling said cooling metal members heated by the high-temperature molten blast furnace slag poured into said cooling grooves (hereinafter referred to as the "earlier invention").

The aforementioned apparatus for manufacturing a vitreous blast furnace slag (hereinafter referred to as the "apparatus of the earlier invention") has a high cooling rate sufficient to substantially completely vitrify a molten blast furnace slag, and furthermore, the molten blast furnace slag is cooled rapidly and solidified by the direct contact with the cooling metal members, instead of the direct contact with cooling water. According to the apparatus of the earlier invention, therefore, it is possible to manufacture a vitreous blast furnace slag which is substantially completely vitrified, substantially free of water, excellent in grindability, and has a high quality as a raw material for a cement or for a calcium silicate fertilizer. In the earlier invention, however, a plurality of cooling metal members form the substantially circular barrel of the rotary drum. In the apparatus of the earlier invention, therefore, in order to improve the production capacity, it is necessary to use wider cooling metal members to increase the number of cooling grooves, or to use a rotary drum with a larger diameter to increase the number of cooling metal members. However, with wider cooling metal members comprising a larger number of cooling grooves, it becomes difficult to uniformly pour a molten blast furnace slag into the cooling groovs. With more cooling metal members with a larger-diameter rotary drum, it is necessary to ensure a sufficient head between the slag container and the cooling metal members by providing a pit in the ground and accommodating the lower portion of the rotary drum in this pit, thus requiring higher installation costs.

SUMMARY OF THE INVENTION

A principal object of the present invention is therefore to provide an apparatus for manufacturing a vitreous blast furnace slag, which has a high cooling rate sufficient to substantially completely vitrify a molten blast furnace slag.

An object of the present invention is to provide an apparatus for manufacturing a vitreous blast furnace slag substantially free of water with a very low porosity and a large internal strain.

Another object of the present invention is to provide an apparatus for manufacturing a vitreous blast furnace slag excellent in grindability.

Further another object of the present invention is to provide an apparatus for manufacturing a vitreous blast furnace slag adapted to serve as a raw material for a cement or for a calcium silicate fertilizer.

An additional object of the present invention is to provide an apparatus for manufacturing a vitreous blast furnace slag which has a high production capacity and which requires low installation costs.

In accordance with one of the features of the present invention, there is provided an apparatus for manufacturing a vitreous blast furnace slag, which comprises:

an endless conveyor belt including a pair of pulleys, formed by endlessly connecting a plurality of rectangular cooling metal members, each of said plurality of cooling metal members having, on the outer surface thereof, a plurality of narrow and deep cooling grooves with the longitudinal direction substantially in parallel with the travelling direction of said endless conveyor belt, each of said plurality of cooling grooves comprising an outwardly flaring inlet section for introducing a molten blast furnace slag and an inwardly narrowing cooling section, following said inlet section, for rapidly cooling and solidifying the molten blast furnace slag into a vitreous blast furnace slag, and said cooling section having a top end width within the range of from 3 to 10 mm and a depth within the range of from 2 to 20 times said top end width;

a driving means, connected to at least one of said pair of pulleys, for travelling said endless conveyor belt;

a molten slag container arranged above the upstream of the upper fowarding position of said endless conveyor belt, said molten slag container being adapted to receive a molten blast furnace slag discharged from a blast furnace and pour said molten blast furnace slag thus received into said plurality of cooling grooves of said cooling metal member reaching the upstream of the upper forwarding position of said endless conveyor belt along with the travel of said endless conveyor belt;

a stripper arranged, in the upstream of the lower returning position of said endless conveyor belt, at a prescribed position adjacent to the back surface of said endless conveyor belt, said stripper being adapted to take out a cooled and solidified vitreous blast furnace slag in said plurality of cooling grooves of said cooling metal member; and, a cooling means arranged at a prescribed position in the lower returning position of said endless conveyor belt, said cooling means being adapted to sequentially cool said cooling metal members heated by the high-temperature molten blast furnace slag poured into said cooling grooves after stripping the vitreous blast furnace slag.

BRIEF DESCRIPTION OF THE DRAWINGS

FIG. 1(A) is a schematic sectional view illustrating an embodiment of the apparatus for manufacturing a vitreous blast furnace slag of the present invention;

FIG. 1(B) is a schematic sectional view illustrating another embodiment of the apparatus for manufacturing a vitreous blast furnace slag of the present invention;

DETAILED DESCRIPTION OF PREFERRED EMBODIMENTS

Figure 2A:
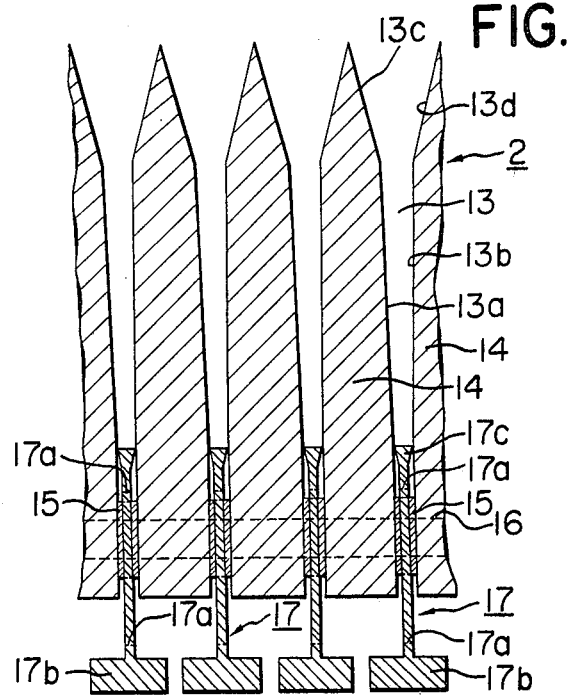
FIG. 2(A) is a schematic sectional view illustrating an embodiment of the cooling metal member, one of the component parts of the apparatus for manufacturing a vitreous blast furnace slag of the present invention.

With a view to solving the problems mentioned above in the manufacture of the conventional water-granulated blast furnace slag and the other conventional granulated blast furnace slags, we carried out extensive studies, and obtained the following findings:

(1) Rapid cooling of a molten blast furnace slag by the direct contact with cooling water as in the manufacture of the conventional water-granulated blast furnace slag not only forms a cause of a high water content of the granulated blast furnace slag thus obtained, but also causes soluble substances useful for cement contained in the slag such as lime, silica and alumina to be lost by dissolution into the cooling water.

(2) Allowing a molten blast furnace slag to expand without restriction in the cooling step as in the manufacture of the conventional water-granulated blast furnace slag and the other granulated blast furnace slags results in a porous granulated blast furnace slag, and hence forms a cause of a high water content. Furthermore, unless expansion of the molten blast furnace slag in the cooling step is restricted, the small internal strain of the granulated blast furnace slag thus obtained requires a large quantity of electric power for fine pulverizing.

(3) In a method in which a molten blast furnace slag is granulated, cooled and solidified by bringing the molten blast furnace slag into contact with the inner surface of a rotary drum as in the aforementioned prior art (2), or by causing the molten blast furnace slag to scatter under the effect of centrifugal force produced by the rotation of a rotary disk or a rotary drum as in the aforementioned prior arts (1), (3) and (4), it is impossible to obtain a high cooling rate sufficient to substantially completely vitrify the molten blast furnace slag.

(4) A high cooling rate sufficient to substantially completely vitrify a moten blast furnace slag can be obtained if the molten blast furnace slag is rapidly cooled by bringing the molten blast furnace slag into direct contact with the surface of cooling metal members made of a metal having a high thermal conductivity such as copper, and the quantity of molten blast furnace slag to be rapidly cooled is always limited to below a certain prescribed quantity. In this case, furthermore, it is possible to manufacture a vitreous blast furnace slag substantially free of water, since the molten blast furnace slag does not contact directly with cooling water. This not only eliminates the necessity of drying cost of the product, but also minimizes the required transportation cost, because the product is always transported in a state free of water.

(5) When a plurality of narrow and deep cooling grooves of prescribed dimensions are formed on the surface of the cooling metal member mentioned in (4) above and a molten blast furnace slag is poured into said cooling grooves, as in the aforementioned earlier invention, it is possible to always limit to below a certain quantity the quantity of molten blast furnace slag to be rapidly cooled per unit area of the cooling metal member, hence of the cooling groove, and thus to obtain a high cooling rate sufficient to substantially completely vitrify the molten blast furnace slag. In addition, because expansion of the molten blast furnace slag in the cooling step in this case is restricted by the two opposite cooling surfaces of the cooling grooves, it is possible to manufacture a vitreous blast furnace slag with a very low porosity and a large internal strain. The vitreous blast furnace slag thus obtained is therefore not only substantially free of water but also excellent in grindability. However, when employing an apparatus for manufacturing a vitreous blast furnace slag including a rotary drum having a substantially circular barrel formed by endlessly connecting a plurality of cooling metal members each with a plurality of cooling grooves formed on the surface thereof, as in the earlier invention, increase of the number of cooling metal members by using a rotary drum having a larger diameter to improve the production capacity necessitates accommodating the lower portion of the rotary drum in a pit provided in the ground for ensuring a sufficient head between the slag container and the cooling metal members, thus requiring higher installation costs. It is therefore desirable to convert the rotary drum of the apparatus for manufacturing a vitreous blast furnace slag of the earlier invention into one with another structure from the point of view of improving the production capacity.

The present invention was developed based on the findings described in (1) to (5) above, and the apparatus for manufacturing a vitreous blast furnace slag of the present invention comprises:

an endless conveyor belt including a pair of pulleys, formed by endlessly connecting a plurality of rectangular cooling metal members, each of said plurality of cooling metal members having, on the outer surface thereof, a plurality of narrow and deep cooling grooves with the longitudinal direction substantially in parallel with the travelling direction of said endless conveyor belt, each of said plurality of cooling grooves comprising an outwardly flaring inlet section for introducing a molten blast furnace slag and an inwardly narrowing cooling section, following said inlet section, for rapidly cooling and solidifying the molten blast furnace slag into a vitreous blast furnace slag, and said cooling section having a top end width within the range of from 3 to 10 mm and a depth within the range of from 2 to 20 times said top end width;

a driving means, connected to at least one of said pair of pulleys, for travelling said endless conveyor belt;

a molten slag container arranged above the upstream of the upper fowarding position of said endless conveyor belt, said molten slag container being adapted to receive a molten blast furnace slag discharged from a blast furnace and pour said molten blast furnace slag thus received into said plurality of cooling grooves of said cooling metal member reaching the upstream of the upper forwarding position of said endless conveyor belt along with the travel of said endless conveyor belt;

a stripper arranged, in the upstream of the lower returning position of said endless conveyor belt, at a prescribed position adjacent to the back surface of said endless conveyor belt, said stripper being adapted to take out a cooled and solidified vitreous blast furnace slag in said plurality of cooling grooves of said cooling metal member; and a cooling means arranged at a prescribed position in the lower returning position of said endless conveyor belt, said cooling means being adapted to sequentially cool said cooling metal members heated by the high-temperature molten blast furnace slag poured into said cooling grooves after stripping the vitreous blast furnace slag.

Now, the apparatus for manufacturing a vitreous blast furnace slag of the present invention is described more in detail with reference to the drawings.

FIG. 1 (A) is a schematic sectional view illustrating an embodiment of the apparatus for manufacturing a vitreous blast furnace slag of the present invention. In FIG. 1 (A), 1 is an endless conveyor belt; 2 are a plurality of rectangular cooling metal members forming the endless conveyor belt 1; and, 10 are a pair of pulleys for travelling the endless conveyor belt 1.

As shown in FIG. 1 (A), the plurality of cooling metal members 2 are mutually endlessly connected to form the endless conveyor belt 1. The endless conveyor belt 1 is supported by a plurality of support rollers which are not shown in FIG. 1 (A) to simplify the drawing. At least one pulley 10 is driven by a driving means (not shown), whereby the endless conveyor belt 1 travels at a prescribed speed in the arrow direction in FIG. 1 (A). Each of the plurality of cooling metal members 2 has, on the outer surface thereof, a plurality of narrow and deep cooling grooves 13, formed as mentioned later, with the longitudinal direction substantially in parallel with the travelling direction of the endless conveyor belt 1.

Figure 2C:
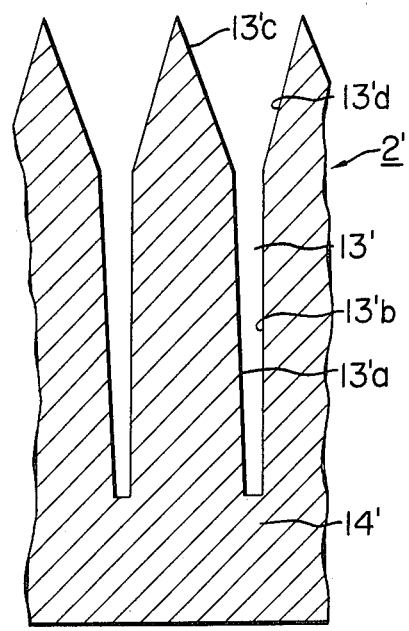
FIG. 2(C) is a schematic sectional view illustrating further another embodiment of the cooling metal member, one of the component parts of the apparatus for manufacturing a vitreous blast furnace slag of the present invention.
Figure 2B:
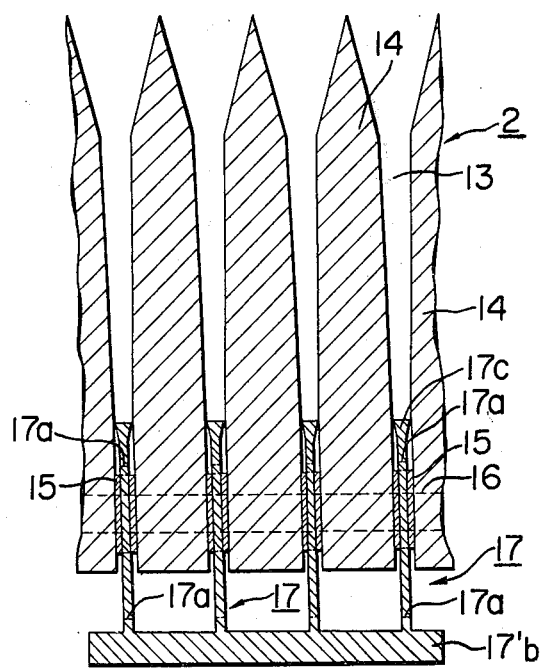
FIG. 2(B) is a schematic sectional view illustrating another embodiment of the cooling metal member, one of the component parts of the apparatus for manufacturing a vitreous blast furnace slag of the present invention.

The most important features of the apparatus for manufacturing a vitreous blast furnace slag of the present invention lie in the cooling metal members 2 and the plurality of cooling grooves 13 formed on the outer surface thereof as shown in FIG. 2 (A). FIG. 2 (A) is a schematic sectional view illustrating an embodiment of the cooling metal member, one of the component parts of the apparatus for manufacturing a vitreous blast furnace slag of the present invention.

As shown in FIG. 2 (A), the cooling metal member 2 comprises a plurality of rectangular metal plates 14 each with a sharp upper edge. The metal plates 14 should preferably be made of a metal having a high thermal conductivity such as copper, and may also be made of iron or steel. The plurality of metal plates 14 are integrally tightened, with spacers 15 between the individual metal plates 14, at the lower portions thereof, by at least two tightening rods 16 penetrating the metal plates 14 and the spacers 15 at prescribed intervals (these intervals forming the cooling grooves 13), whereby a rectangular cooling metal member 2 having a plurality of cooling grooves 13 on the outer surface therof is formed.

As shown in FIG. 2 (A), each of the cooling grooves 13 comprises an outwardly flaring inlet section composed of two mutually opposite opening surfaces 13c and 13d having a relatively large inclination angle against the vertical line, for introducing a molten blast furnace slag, and a cooling section gradually narrowing in the depth direction, immediately following said inlet section, composed of two mutually opposite cooling surfaces 13a and 13b having a small inclination angle against the vertical line which follow the two opening surfaces 13c and 13d, for cooling and solidifying the molten blast furnace slag into a vitreous blast furnace slag.

As shown in FIG. 2 (A), the bottom of each of the plurality of cooling grooves 13 having the above-mentioned structure is equipped with a pushing board 17 having an inverse-T shaped cross-section, which comprises a rectangular plate 17c having a length substantially equal to the length of the cooling groove 13 and a stopper 17b serving also as a weight fixed to an end of the plate 17c, in such a manner that the other end of the plate 17c is inserted into the cooling groove 13 and the end fixed with the stopper 17b projects from the back surface of the cooling metal member 2. The tip portion of the other end of the plate 17c inserted into the cooling groove 13 is made thicker by upsetting and forms the bottom surface of the cooling groove 13. The plate 17c of the pushing board 17 inserted into the cooling groove 13 is provided with a hole 17a larger than the spacer 15 which engages in the hole 17a. The pushing board 17 can therefore slide up and down in the cooling groove 13 along the depth direction of the cooling groove 13 within the range of play between the hole 17a and the spacer 15.

FIG. 2 (A) represents the state of the pushing board 17 when the cooling metal member 2 reaches the upper forwarding position of the endless conveyor belt 1, i.e., when the plurality of cooling grooves 13 of the cooling metal member 2 reach the position with openings thereof directed upward (hereinafter referred to as the "positive position") along with the travel of the endless conveyor belt 1. At the positive position, the pushing board 17 is located at the lowest position. More particularly, at the positive position, the pushing board 17 lowers along the depth direction of the cooling groove 13 by the gravity of the stopper 17b and/or by operating a restorer described later, and, stops as the upset end of the plate 17c of the pushing board 17 is pinched by the two mutually opposite cooling surfaces 13a and 13b constituting the cooling section narrowing in depth direction of the cooling groove 13. In this state, the cooling groove 13 is deepest and can receive a molten blast furnace slag. On the other hand, when the cooling metal member 2 reaches the lower returning position of the endless conveyor belt 1, i.e., when the plurality of cooling grooves 13 of the cooling metal member 2 reach the position with openings thereof directed downward (hereinafter referred to as the "reverse position") along with the travel of the endless conveyor belt 1, the pushing board 17 is pushed into the cooling groove 13 by a stripper described later until the stopper 17b comes into contact with the back surface of the cooling metal member 2. In this state, the depth of the cooling groove 13 is smallest.

The cooling section of the cooling groove 13 which is composed of the two mutually opposite cooling surfaces 13a and 13b should preferably have a width of from 3 to 10 mm at the top end thereof, and the cooling section of the cooling groove 13 shold preferably have a depth of from 2 to 20 times the above-mentioned top end width at the positive position, i.e., when the pushing board 17 is at the lowest position. This is because, with a top end width of the cooling groove 13 of under 3 mm, it is impossible to satisfactorily pour the molten blast furnace slag into the cooling section of the cooling groove 13, and on the other hand, with a width of said top end of over 10 mm, a higher cooling rate sufficient to substantially completely vitrify the molten blast furnace slag cannot be obtained because of the too large interval between the cooling surfaces 13a and 13b, resulting in partial crystallization, not being vitrified, of the molten blast furnace slag. With a depth of the cooling section of the cooling groove 13 of under 2 times the width of said top end, the operating efficiency is low because of the two small quantity of treated molten blast furnace slag. With a depth of the cooling section of the cooling groove 13 of over 20 times the width of said top end, on the other hand, it is difficult to satisfactorily take out a cooled and solidified vitreous blast furnace slag from the cooling section of the cooling groove 13. In order to obtain a desired cooling rate, the metal plate 14 should have a thickness, at the position of the top end of the cooling section of the cooling groove 13, of at least 2 times, and preferably at least 3 times the width of the top end of the cooling section.

As shown in FIG. 1 (A), a molten slag container 3 is arranged above the upstream of the upper forwarding position of the endless conveyor belt 1. The molten slag container 3 receives a molten blast furnace slag 5 from a blast furnace (not shown) through a feeding runner 4. The molten blast furnace slag 5 received into the molten slag container 3 is poured into the plurality of cooling grooves 13 of the cooling metal member 2 at the positive position from among the plurality of cooling metal members 2 forming the endless conveyor belt 1 in travel, through a pouring nozzle 3a provided at the bottom of the molten slag container 3.

In FIG. 1 (A), 6 is a stripper equipped with rollers 6a. The stripper 6 is arranged, in the upstream of the lower returning position of the endless conveyor 1, adjacent to the back surface of the cooling metal member 2 at the reverse position. The stripper 6 is stationarily held at a prescribed position by a support (not shown) such as a boom. The rollers 6a of the stripper 6 push the plates 17c, in contact with the stoppers 17b of the pushing boards 17 of the cooling metal member 2 at the reverse position, into the cooling grooves 13, until the stoppers 17b come into contact with the back surface of the cooling metal member 2. As a result, a cooled and solidified vitreous blast furnace slag in the cooling grooves 13 is pushed out from the cooling grooves 13 and discharged into a vitreous slag receiver 8. A stripper comprising a vibrator and a vibrating terminal may be employed in place of the above-mentioned stripper 6. In this case, the plates 17c of the pushing boards 17 are allowed to go into the cooling grooves 13 until the stoppers 17b come into contact with the back surface of the cooling metal member 2 by applying vibrations to the back surface of the cooling metal member 2 by means of the vibrating terminal of the vibrator, and the cooled and solidified vitreous blast furnace slag 7 in the cooling grooves 13 is discharged into the vitreous slag receiver 8.

In FIG. 1 (A), 9 are a plurality of spray nozzles. The plurality of spray nozzles 9 are arranged on the downstream side of the stripper 6 in the lower returning position of the endless conveyor belt 1. The plurality of spray nozzles 9 spray cooling water to the cooling metal members 2 in travel heated by the high-temperature molten blast furnace slag 5 poured into the cooling grooves 13 after stripping of the vitreous blast furnace slag 7. The cooling metal members 2 forming the endless conveyor belt 1, which have been heated by the molten blast furnace slag 5 are thus sequentially cooled. Since cooling water is sprayed to the cooling metal member 2 at the reverse position thereof, i.e., at the position with the cooling grooves 13 thereof directed downward, the cooling water never remains in the cooling grooves 13, and the cooling water deposited onto the surface of the cooling metal member 2 is immediately evaporated by the heat held by the cooling metal member 2. There is therefore no danger of steam explosion at the time of pouring of the molten blast furnace slag 5 into the cooling grooves 13.

In FIG. 1 (A), 12 is a restorer of the pushing board 17. The restorer 12 is arranged adjacent to the back surface of the cooling metal member 2 at the positive position on the upstream side of the molten slag container 3 in the upper forwarding position of the endless conveyor belt 1. The restorer 12 is stationarily held at a prescribed position by a support (not shown) such as a boom. The restorer 12 pulls out the pushing board 17 which has been pushed into the cooling grooves 13 by the stripper 6 to the lowest position, i.e., the receiving position of molten blast furnace slag 5. The restorer 12 comprises, for example, a magnet, and pulls out the pushing board 17 under the effect of magnetism of the magnet to the lowest position. In this case, therefore, at least a part of the stopper 17b of the pushing board 17 should be made of a magnetizable material such as steel. When the stopper 17b is made of a non-magnetizable material such as silicon carbide, the restorer 12 may be made so as to mechanically pull out the pushing board 17. Although only one restorer 12 may be installed, it is desirable to arrange at least two restorers 12 from safety considerations, because insufficient withdrawal of the pushing board 17, if any, may be dangerous.

A vitreous blast furnace slag is manufactured as follows by means of the apparatus for manufacturing a vitreous blast furnace slag of the present invention having the structure as mentioned above. More specifically, as shown in FIG. 1 (A), a molten blast furnace slag 5 received in the molten slag container 3 through the feeding runner 4 is poured through the pouring nozzle 3a into the plurality of cooling grooves 13 of the cooling metal member 2 at the positive position (i.e., at the position for receiving molten blast furnace slag) reaching the upstream of the upper forwarding position of the endless conveyor belt 1 in travel in the arrow direction in the drawing, and cooled and solidified at a high cooling rate by the two mutually opposite cooling surfaces 13a and 13b composing the cooling section of the cooling grooves 13 into a substantially completely vitrified blast furnace slag.

Then, along with the travel of the endless conveyor belt 1, when the cooling metal member 2 filled with the solidified vitreous blast furnace slag reaches the upstream of the lower returning position of the endless conveyor belt 1 (the cooling metal member 2 being at the reverse position), the pushing boards 17 of the cooling metal member 2 is pushed into the cooling grooves 13 by the stripper 6, and thus the cooled and solidified vitreous blast furnace slag 7 in the cooling grooves 13 is pushed out from the cooling grooves 13 in granular or sheet shape, falling into the vitreous slag receiver 8. In addition, as mentioned above, since the molten blast furnace slag 5 is rapidly cooled in a state in which expansion thereof is restricted by the two mutually opposite cooling surfaces 13a and 13b composing the cooling section of the cooling grooves 13, the vitreous blast furnace slag obtained not only is substantially completely vitrified, but also has a very low porosity and a large internal strain. The vitreous blast furnace slag obtained is therefore excellent in grindabilily.

Then, the cooling metal member 2 at the reverse position, which has become empty after discharge of the vitreous blast furnace slag reaches, along with the travel of the endless conveyor belt 1, the location of the spray nozzles 9, where the cooling metal member 2 is cooled to a prescribed temperature by the spray of cooling water from the spray nozzles 9.

Then, when the cooling metal member 2 thus cooled reaches, along with the travel of the endless conveyor belt 1, the upstream of the upper forwarding position of the endless conveyor belt 1 (the cooling metal member 2 having returned to the positive position), the pushing boards 17 of the cooling metal member 2 are withdrawn by the restorer 12 to the lowest position, i.e., to the position for receiving molten blast furnace slag. When the cooling metal member 2 reaches again the position where the molten slag container 3 is installed along with the travel of the endless conveyor belt 1, a molten blast furnace slag is poured into the cooling grooves 13 of the cooling metal member 2 as mentioned above, and thus, manufacture of the vitreous blast furnace slag is continuously carried out.

When using the cooling metal members 2 of the present invention, the molten blast furnace slag 5 is substantially completely vitrified by the stay in the cooling grooves 13 for about 3 to 7 seconds from the beginning of pouring into the cooling grooves 13 of the cooling metal member 2. The length and the travelling speed of the endless conveyor belt 1 are therefore decided so as to give a staying time within the above-mentioned range.

The plurality of spray nozzles 9 described above with reference to FIG. 1 (A) may be replaced by a cooling tank 11, as shown in the schematic sectional view of FIG. 1 (B). In FIG. 1 (B), 11 is a cooling tank containing cooling water. The cooling tank 11 is arranged below the endless conveyor belt 1 so that the lower returning portion of the endless conveyor belt 1 is immersed in the cooling water in the cooling tank 11. The plurality of cooling metal members 2 composing the endless conveyor belt 1 are sequentially immersed, along with the travel of the endless conveyor belt 1, into the cooling water in the cooling tank 11, whereby the cooling metal members 2 heated by the high-temperature molten blast furnace slag poured into the cooling grooves 13 are cooled. For the purpose of conducting cooling of the cooling metal members 2 more effectively, installation of at least one submerged nozzle (not shown) in the cooling tank 11 as required gives satisfactory results. Said at least one submerged nozzle ejects cooling water, under the surface of cooling water in the cooling tank 11, onto the surfaces of the cooling metal members 2, along the longitudinal direction of the cooling grooves 13 of the cooling metal member 2 immersed into the cooling water in the cooling tank 11. The cooling metal member 2 being immersed into the cooling water at the reverse position, the cooling water never remains in the cooling grooves 13. The cooling water deposited on the surface of the cooling metal member 2 is evaporated by the heat held by the cooling metal member 2 immediately after the cooling metal member 2 comes out from the cooling water in the cooling tank 11. There is therefore no danger of steam explosion at the time of next pouring of molten blast furnace slag 5 into the cooling grooves 13.

When using the apparatus for manufacturing a vitreous blast furnace slag including the cooling tank 11 shown in FIG. 1 (B), the cooled and solidified vitreous blast furnace slag 7 in the cooling grooves 13 is discharged by the stripper 6 in granular or sheet shape into the cooling water in the cooling tank 11. Not only the temperature of the cooling water in the cooling tank 11 is raised substantially to the boiling point by heat exchange with the cooling metal members 2 and the vitreous blast furnace slag 7, but also, the vitreous blast furnace slag 7 has still a high temperature. Therefore, when the vitreous blast furnace slag 7 discharged into the cooling water in the cooling tank 11 is taken out by an appropriate means (not shown), water deposited on the surface of the vitreous blast furnace slag 7 is immediately evaporated. In addition, as mentioned above, since the molten blast furnace slag is rapidly cooled in a state in which expansion thereof is restricted, in the present invention, the resultant vitreous blast furnace slag has a very low porosity. Therefore, the vitreous blast furnace slag thus obtained is substantially free of water even when discharging same into the cooling water. In FIG. 1 (B), the same reference numerals as those in FIG. 1 (A) represent the same things as in FIG. 1 (A).

In the cooling metal member 2 described above with reference to FIG. 2 (A), a stopper 17b is fixed to an end of each of the plurality of plates 17c. As shown in FIG. 2 (B), a single and common stopper 17'b may be fixed to ends of the plurality of plates 17c. In FIG. 2 (B), the same reference numerals as those in FIG. 2 (A) represent the same things as in FIG. 2 (A).

The cooling metal member 2 described above with reference to FIG. 2 (A) may be replaced by another cooling metal member 2' as shown by the schematic sectional view of FIG. 2 (C). The cooling metal member 2' shown in FIG. 2 (C) comprises a single rectangular metal plate 14' which is provided, on the outer surface thereof, by casting or by machining, with a plurality of cooling grooves 13' comprising an inlet section and a cooling section having the same shape and the same dimensions as the cooling grooves 13 comprising the inlet section and the cooling section when the pushing board 17 is at the lowest position described above in detail with reference to FIG. 2 (A). More particularly, each of the cooling grooves 13' comprises an outwardly flaring inlet section composed of two mutually opposite opening surfaces 13'c and 13'd having a relatively large inclination angle against the vertical line, for introducing a molten blast furnace slag, and a cooling section gradually narrowing in the depth direction, immediately following said inlet section composed of two mutually opposite cooling surfaces 13'a and 13'b having a small inclination angle against the vertical line which follow the two openings surfaces 13'c and 13'd, for cooling and solidifying the molten blast furnace slag into a vitreous blast furnace slag. As mentioned above, the bottom surface of each of the cooling grooves 13 of the cooling metal member 2 described with reference to FIG. 2 (A) is formed by the upset end of the plate 17c of the pushing board 17, whereas the cooling metal member 2' shown in FIG. 2 (C) has not a special component part such as a pushing board 17, and the bottom surface of the cooling groove 13' is formed with metal plates alone.

Therefore, when using the cooling metal member 2' shown in FIG. 2 (C), the stripper 6 equipped with the rollers 6a should be replaced by a stripper 6 comprising a vibrator and a vibrating terminal. In this case, vibrations are applied to the back face of the cooling metal member 2' by the vibrating terminal of the vibrator, thereby causing the vitreous blast furnace slag cooled and solidified in the cooling grooves 13' to fall from the cooling grooves 13'. When using the cooling metal member 2' shown in FIG. 2 (C), it is needless to mention that a restorer 12 is not necessary.

Now, the apparatus for manufacturing a vitreous blast furnace slag of the present invention is described more in detail by means of an example.

EXAMPLE

An endless conveyor belt 1 with a wheel base between two pulleys 10 and 10 of 2 m as shown in FIG. 1 (B) was formed by endlessly connecting cooling metal members 2 made of copper of a thickness of 60 mm having a structure as described above with reference to FIG. 2 (A). The outer surface of each of the cooling metal members 2 was provided with 20 cooling grooves 13 each comprising an inlet section and a cooling section with the longitudinal direction substantially in parallel with the travelling direction of the endless conveyor belt 1. The top end of the cooling section of each of the cooling grooves 13 had a width of 4 mm; the bottom surface of the cooling section when the pushing board 17 was at the lowest position had a width of 2 mm; and the cooling section had a depth of 40 mm when the pushing board 17 was at the lowest position. Each of metal plates 14 composing the cooling metal member 2 had a thickness of 15 mm at the top end position of said cooling section.

Then, molten blast furnace slag 5 in the molten slag container 3 was poured through the pouring nozzle 3a into the cooling grooves 13 of the cooling metal member 2 having reached the upstream of the upper forwarding position of the endless conveyor belt 1, thus taking the positive position, i.e., the receiving position of molten blast furnace slag, while travelling the endless conveyor belt 1 at a speed of from 0.2 to 0.3 m per second by driving one of the pulleys 10 by means of the driving means (not shown), so that the cooling section was substantially filled with the poured molten blast furnace slag 5. The poured molten blast furnace slag was rapidly cooled at a high cooling rate by the two mutually opposite cooling surfaces 13a and 13b composing the cooling section of the cooling grooves 13 into a substantially completely vitrified blast furnace slag.

Then, when the cooling metal member 2 filled with the vitreous blast furnace slag reached the upstream of the lower returning position of the endless conveyor belt 1, (i.e., when the cooling metal member 2 came into cooling water in the cooling tank 11) along with the travel of the endless conveyor belt 1, the pushing boards 17 of the cooling metal member 2 at the reverse position were pushed by the stripper 6 into the cooling grooves 13, whereby the vitreous blast furnace slag 7 cooled and solidified in the cooling grooves 13 was pushed out in granular or sheet shape from the cooling grooves 13 and fell into the cooling tank 11. When the vitreous blast furnace slag having fallen into the cooling water in the cooling tank 11 was taken out by an appropriate means (not shown) from the cooling tank 11, water deposited on the surface of the vitreous blast furnace slag 7 was immediately evaporated, and thus, a vitreous blast furnace slag 7 substantially free of water was obtained.

On the other hand, when the empty cooling metal member 2 at the reverse position cooled by the cooling water in the cooling tank 11 reached the installation position of the restorer 12 in the upstream of the upper forwarding position of the endless conveyor belt 1 along with the travel of the endless conveyor belt 1 (the cooling metal member 2 having returned to the positive position at this moment), the pushing boards 17 of the cooling metal member 2 were withdrawn by the restorer 12 to the lowest position, i.e., to the receiving position of molten blast furnace slag, and thus, the cooling metal member 2 returned to the state of receiving the next batch of molten blast furnace slag.

The vitreous blast furnace slag obtained by the apparatus of the present invention as mentioned above (hereinafter simply referred to as the "slag of the present invention") and a dried water-granulated blast furnace slag obtained by a conventional manufacturing process (hereinafter simply referred to as the "conventional water-granulated slag") were individually subjected to a rough grinding and a removal of iron, and adjusted to a particle size of up to 1.2 mm. A grinding test was carried out on specimens each weighing 2 kg sampled respectively from the slag of the present invention and the conventional water-granulated slag, the particle size of which was thus adjusted. The grinding test was conducted, with the use of a small ball mill charged with 20 kg of steel balls having a diameter of 22 mm, by measuring the grinding time required until the Blaine fineness based on the Blaine-air-permeability method reached 4,200 cm$^2$/g for each of the specimens.

The grinding time measured in the aforementioned grinding test was as follows:

(a) Specimens of the slag of the present invention: from 167 to 200 minutes;
(b) Specimens of the conventional water-granulated slag: from 207 to 220 minutes.

This clarified that the grindability expressed in the grinding time is higher by from about 10 to about 20% in the slag of the present invention than the conventional water-granulated slag. In addition, the Blaine fineness was measured for each of the specimens at intervals of 20 minutes until the Blaine fineness reached 4,000 cm²/g from the beginning of the grinding test. According to the results of this measurement, the slag of the present invention had a grindability higher by from about 15 to about 20% than the conventional water-granulated slag even at low Blaine fineness values.

Figure 3:
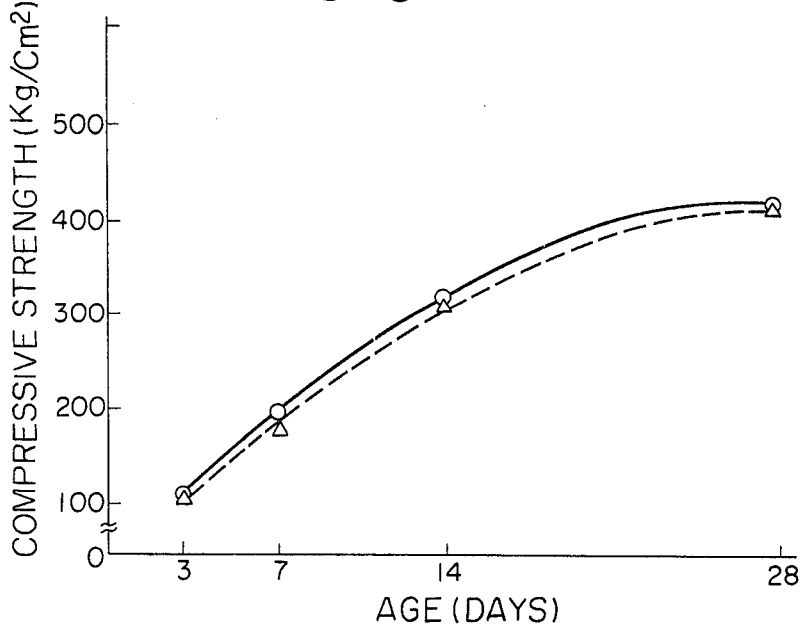
FIG. 3 is a graph illustrating results of measurement of compressive strength of test specimens of mortar of a blast furnace cement prepared from a vitreous blast furnace slag manufactured by the apparatus for manufacturing a vitreous blast furnace slag of the present invention.
Figure 4:
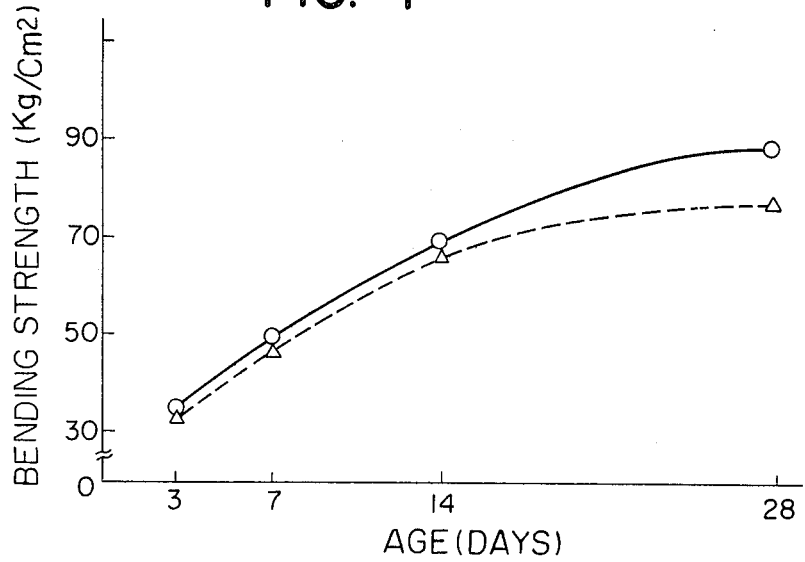
FIG. 4 is a graph illustrating results of measurement of bending strength of test specimens of mortar of a blast furnace cement prepared from a vitreous blast furnace slag manufactured by the apparatus for manufacturing a vitreous blast furnace slag of the present invention; and, FIG. 5 is a graph illustrating results of differential thermal analysis of a vitreous blast furnace slag manufactured by the apparatus for manufacturing a vitreous blast furnace slag of the present invention.

Then, the slag of the present invention finely pulverized to a Blaine fineness of 4,200 cm²/g was mixed with ordinary Portland cement at a weight ratio of 4:6, and a blast furnace cement specified in JIS (abbreviation of the Japanese Industrial Standards) R5211-1977 was prepared by adding gypsum so as to give an SO₃ content in the product blast furnace cement of 2.0 wt.%. From the resultant blast furnace cement, mortar specimens having dimensions of 4 cm×4 cm×16 cm for the strength test specified in JIS R5201-1977 were prepared by mixing and kneading the resultant blast furnace cement, standard sand and water at a weight ratio of 1:2:0.65. For comparison purposes, on the other hand, other mortar specimens were prepared under the same conditions as those mentioned above except that the conventional water-granulated slag finely pulverized to the same Blaine fineness (4,200 cm²/g) was used in place of the slag of the present invention. Compressive strength and bending strength were measured for each of the respective mortar specimens at ages of 3, 7, 14 and 28 days. The results of measurement of compressive strength (kg/cm²) are shown in FIG. 3, and the results of measurement of bending strength (kg/cm²), in FIG. 4. In FIGS. 3 and 4, the solid line connecting the plots "o" represents the mortar specimens prepared with the slag of the present invention, and the dotted line connecting the plots "Δ" represents the mortar specimens prepared with the conventional water-granulated slag.

As is evident from FIGS. 3 and 4, compressive strength and bending strength of the mortar of the blast furnace cement manufactured with the slag of the present invention show almost no difference as compared with those of the mortar of the blast furnace cement manufactured with the conventional water-granulated slag, indicating that there is no remarkable difference in hydraulicity between the two slags.

Then, a differential thermal analysis was carried out on the finely pulverized slag of the present invention and the finely pulverized conventional water-granulated slag. The results of said differential thermal analysis are shown in FIG. 5. In FIG. 5, the maximum exothermic peaks observed in the temperature region of from about 860° to about 870° C. were caused by the devitrification heat of glass. The results of the differential thermal analysis given in FIG. 5 indicate that the slag of the present invention, having a higher exothermic peak than the conventional water-granulated slag, has a higher internal potential, and hence a less stable structure than the conventional water-granulated slag. This means that the slag of the present invention has a higher reactivity, and is therefore more suitable as a material for a cement than the conventional water-granulated slag.

Then, 150 ml of N/2 aqueous hydrochloric acid solution and 150 ml of 2% aqueous citric acid solution were respectively added to 1 g of the slag of the present invention having a particle size of up to 250 μm and 1 g of the conventional water-granulated slag having a particle size of up to 250 μm. After shaking by rotation at a temperature of 20° C. for 60 minutes, these solutions were rapidly filtered, and the resultant residues were rinsed and dried to measure the solubility of SiO₂, CaO and MgO. The results of this measurement are shown in Table 1. In Table 1, "T" represents the total quantity of each constituent; "S" represents the dissolved quantity of each constituent into the N/2 aqueous hydrochloric acid solution; and "C" indicates the dissolved quantity of each constituent into the 2% aqueous citric acid solution.

TABLE 1

| | Solubility (%) | |
|---|---|---|
| | Slag of the present invention | Conventional water-granulated slag |
| S . SiO₂/T . SiO₂ | 93.5% | 89.8% |
| S . CaO/T . CaO | 99.3% | 100.0% |
| S . MgO/T . MgO | 95.1% | 98.7% |
| C . MgO/T . MgO | 80.0% | 96.7% |

As is evident from the results of measurement shown in Table 1, the slag of the present invention has a higher solubility of SiO₂ constituent into N/2 aqueous hydrochloric acid solution as compared with the conventional water-granulated slag, indicating that the slag of the present invention has an excellent quality as a raw material for a calcium silicate fertilizer.

As described above in detail, the apparatus for manufacturing a vitreous blast furnace slag of the present invention can give a high cooling rate sufficient to substantially completely vitrify a molten blast furnace slag, and moreover, the molten blast furnace slag is rapidly cooled, not coming into direct contact with cooling water, in a state in which expansion thereof is restricted. According to the apparatus for manufacturing a vitreous blast furnace slag of the present invention, therefore, it is possible to manufacture a vitreous blast furnace slag having the following excellent properties:

(1) The product vitreous blast furnace slag is substantially completely vitrified;
(2) It is substantially free of water because of the very low porosity, this not only reducing transportation cost, but also eliminating the necessity of drying costs;
(3) It is excellent in grindability because of the large internal strain, this minimizing time and labor required for fine pulverizing; and,
(4) It has a high quality as a raw material for a cement or for a calcium silicate fertilizer.

In the apparatus including a rotary drum of the ealier invention described above, furthermore, increase of the number of cooling metal members by using a rotary drum having a larger diameter to improve the production capacity, necessitates accommodating the lower portion of the rotary drum in a pit provided in the ground for ensuring a sufficient head between the slag container and the cooling metal members, thus requiring higher installation costs. In the apparatus of the present invention, in contrast, improvement of the production capacity can be achieved by only increasing the length of the endless conveyor belt, resulting in lower installation costs than in the apparatus of the earlier invention.

Thus, according to the apparatus for manufacturing a vitreous blast furnace slag of the present invention, many industrially useful effects are provided.

What is claimed is:
1. An apparatus for vitrifying blast furnace slag, comprising:

an endless conveyor belt including a pair of pulleys, said conveyor belt being formed by endlessly connecting a plurality of rectangular cooling metal members, each of said plurality of cooling metal members being of high thermal conductivity and having, on the outer surface thereof, a plurality of elongated narrow and deep cooling grooves, the longitudinal directions of said cooling grooves being substantially in parallel with the travelling direction of said endless conveyor belt, each of said plurality of cooling grooves comprising an outwardly flaring inlet section for receiving a molten blast furnace slag and an inwardly narrowing cooling section, following said inlet section, for rapidly cooling and solidifying the molten blast furnace slag into a vitreous blast furnace slag, said cooling section of each of said cooling grooves having a top end maximum width within the range of from 3 to 10 mm and a depth within the range of from 2 to 20 times said top end maximum width so as to cool the molten blast furnace slag under constraint to thereby produce a large internal strain in the vitrified blast furnace slag, the vitrified blast furnace slag being in the form of elongated sheets having a maximum thickness of 3 to 10 mm;

driving means, connected to at least one of said pair of pulleys, for driving said endless conveyor belt;

a molten slag container arranged above the upstream of the upper forwarding position of said endless conveyor belt, said molten slag container being adapted to receive a molten blast furnace slag discharged from a blast furnace and pour said molten blast furnace slag thus received into said plurality of cooling grooves of said cooling metal member reaching the upstream of the upper forwarding position of said endless conveyor belt along with the travel of said endless conveyor belt;

a stripper arranged, in the upstream of the lower returning position of said endless conveyor belt, at a prescribed position adjacent to the back surface of said endless conveyor belt, said stripper being adapted to take out a cooled and solidified vitreous blast furnace slag in said plurality of cooling grooves of said cooling metal member; and, a cooling means arranged at a prescribed position in the lower returning position of said endless conveyor belt, said cooling means being adapted to sequentially cool said cooling metal members heated by the high-temperature molten blast furnace slag poured into said cooling grooves after stripping the vitreous blast furnace slag.

2. The apparatus as claimed in claim 1, wherein:

each of said plurality of cooling metal members comprises a plurality of rectangular metal plates each with a sharp upper edge, and said plurality of metal plates are integrally tightened, with spacers between said individual metal plates, at the lower portion thereof, by at least two tightening rods penetrating said metal plates and said spacers, at prescribed intervals, thereby forming said cooling metal member having said plurality of cooling grooves corresponding to said prescribed intervals; and wherein, the bottom of each of said plurality of cooling grooves is provided with a pushing board comprising a rectangular plate having substantially the same length as that of said cooling groove and a stopper fixed to an end of said plate in such a manner that the other end of said plate is inserted into said cooling groove and the end fixed with said stopper projects from the back surface of said cooling metal member, and that said pushing board is slidable in the depth direction of said cooling groove, whereby the tip of said other end of said plate inserted into said cooling groove forms the bottom surface of said cooling groove.

3. The apparatus as claimed in claim 2, wherein:

said respective pushing boards inserted into said plurality of cooling grooves have a single and common stopper.

4. The apparatus as claimed in claim 1, wherein:

each of said plurality of cooling metal members comprises a single rectangular metal plate, and the outer surface of said single metal plate is provided with said plurality of cooling grooves.

5. The apparatus as claimed in claim 2, wherein said stripper comprises at least on roller.

6. The apparatus as claimed in claim 3, wherein said stripper comprises at least one roller.

7. The apparatus as claimed in claim 4, wherein said stripper comprises at least one vibrator.

8. The apparatus as claimed in claim 2, wherein:

said apparatus includes a restorer, said restorer being arranged at a prescribed position adjacent to the back surface of said endless conveyor belt on the upstream side of said molten salg container in the upper forwarding position of said endless conveyor belt, and said restorer is adapted to withdraw said pushing boards of said cooling metal member to the lowest position.

9. The apparatus as claimed in claim 3, wherein:

said apparatus includes a restorer, said restorer being arranged at a prescribed position adjacent to the back surface of said endless conveyor belt on the upstream side of said molten slag container in the upper forwarding position of said endless conveyor belt, and said restorer is adapted to withdraw said pushing boards of said cooling metal member to the lowest position.

10. The apparatus as claimed in any one of claims 1 to 9, wherein:

said cooling means comprises a plurality of spray nozzles, said plurality of spray nozzles being arranged at a prescribed position adjacent to said endless conveyor belt on the downstream side of said stripper in the lower returning position of said endless conveyor belt, and said plurality of spray nozzles are adapted to spray cooling water, in the lower returning position of said endless conveyor belt, to said cooling metal member at the reverse position in travel heated by the high-temperature molten blast furnace slag poured into said cooling grooves, after stripping of the vitreous blast furnace slag, thereby sequentially cooling said cooling metal members forming said endless conveyor belt.

11. The apparatus as claimed in any one of claims 1 to 9, wherein:

said cooling means comprises a cooling tank containing cooling water, said cooling tank being arranged below said endless conveyor belt so that the lower returning portion of said endless conveyor belt is immersed in the cooling water, and said cooling tank is adapted to cause said plurality of cooling metal members forming said endless conveyor belt to sequentially pass through the cooling water in said cooling tank along with the travel of said endless conveyor belt, thereby sequentially cooling said cooling metal members at the reverse position heated by the high-temperature molten blast furnace slag poured into said cooling grooves.

12. The apparatus as claimed in claim 1, wherein: each of said plurality of cooling members comprises a plurality of rectangular metal plates, each metal plate having a sharp upper edge, said plurality of metal plates being integrally tightened with spacers between the individual metal plates at the lower portion thereof by means of at least two tightening rods penetrating said metal plates and said spacers at prescribed intervals, thereby forming said cooling metal member having said plurality of cooling grooves corresponding to said prescribed intervals.

* * * * *